US012125345B2

(12) United States Patent
Palmisano

(10) Patent No.: US 12,125,345 B2
(45) Date of Patent: *Oct. 22, 2024

(54) ELECTRONIC GAMING MACHINE REWARD SYSTEM AND METHOD

(71) Applicant: Aristocrat Technologies, Inc., Las Vegas, NV (US)

(72) Inventor: Angelo Palmisano, Henderson, NV (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,713

(22) Filed: Dec. 22, 2022

(65) Prior Publication Data

US 2023/0133509 A1 May 4, 2023

Related U.S. Application Data

(63) Continuation of application No. 17/260,780, filed as application No. PCT/US2019/052846 on Sep. 25, 2019, now Pat. No. 11,544,998.

(60) Provisional application No. 62/741,748, filed on Oct. 5, 2018.

(51) Int. Cl.
*G07F 17/32* (2006.01)

(52) U.S. Cl.
CPC ...... *G07F 17/3244* (2013.01); *G07F 17/3223* (2013.01); *G07F 17/3225* (2013.01)

(58) Field of Classification Search
CPC ............. G07F 17/3244; G07F 17/3223; G07F 17/3225
See application file for complete search history.

(56) References Cited

U.S. PATENT DOCUMENTS 9,336,522 B2 5/2016 Tsutsui
9,824,537 B1 * 11/2017 Pascal ..................... G07F 17/34
2004/0142750 A1 7/2004 Glisson
(Continued)

OTHER PUBLICATIONS

Australian Examination Report No. 1 issued in App. No. AU2021202843, dated Jul. 18, 2022, 4 pages.
(Continued)

*Primary Examiner* — Werner G Garner
(74) *Attorney, Agent, or Firm* — Armstrong Teasdale LLP

(57) ABSTRACT

A reward system includes a tangible, non-transitory, computer-readable storage medium having instructions stored thereon and a processor configured to execute instructions stored in the storage medium. The processor is in communication with a mobile computing device and an electronic gaming machine. When executed by the processor, the instructions causes the processor to at least (i) receive mobile game activity information associated with a mobile game on the mobile computing device; (ii) award the player a first awarded prize based upon the mobile game activity information; (iii) store a first awarded prize entry in a player account for subsequent redemption at the electronic gaming machine, the first awarded prize entry identifies the first awarded prize; (iv) detect a presence of the player at the electronic gaming machine; and (v) instruct the electronic gaming machine to display the first awarded prize when the player accesses the electronic gaming machine.

20 Claims, 11 Drawing Sheets

(56) References Cited

U.S. PATENT DOCUMENTS

| | | | |
|---|---|---|---|
| 2005/0143166 | A1 | 6/2005 | Walker |
| 2006/0089194 | A1 | 4/2006 | Joshi |
| 2006/0143085 | A1 | 6/2006 | Adams |
| 2007/0105613 | A1 | 5/2007 | Adams |
| 2007/0254736 | A1 | 11/2007 | Hardy |
| 2009/0075727 | A1 | 3/2009 | Walker |
| 2012/0015735 | A1 | 1/2012 | Abouchar |
| 2012/0122558 | A1 | 5/2012 | Lyons |
| 2012/0172108 | A1 | 7/2012 | Acres |
| 2012/0208625 | A1 | 8/2012 | Anderson |
| 2013/0130781 | A1 | 5/2013 | Anderson |
| 2014/0057705 | A1 | 2/2014 | Elias |
| 2014/0080579 | A1 | 3/2014 | Abouchar |
| 2015/0154824 | A1 | 6/2015 | Johnson |
| 2015/0310698 | A1 | 10/2015 | Polis |
| 2015/0356823 | A1 | 12/2015 | Anderson |
| 2016/0225233 | A1 | 8/2016 | Arezina |
| 2016/0232750 | A1 | 8/2016 | Hardy |
| 2017/0330418 | A1 | 11/2017 | Link |
| 2018/0089944 | A1 | 3/2018 | Upton |
| 2018/0205725 | A1 | 7/2018 | Cronkright |
| 2018/0350144 | A1 | 12/2018 | Rathod |

OTHER PUBLICATIONS

International Search Report and Written Opinion for App. No. PCT/US1952846, dated Jan. 2, 2020, 16 pages.

Office Action (Non-Final Rejection) dated Jan. 7, 2022 for U.S. Appl. No. 17/260,780 (pp. 1-30).

Office Action (Final Rejection) dated Jul. 5, 2022 for U.S. Appl. No. 17/260,780 (pp. 1-30).

Office Action (Notice of Allowance and Fees Due (PTOL-85)) dated Sep. 16, 2022 for U.S. Appl. No. 17/260,780 (pp. 1-12).

Office Action (Notice of Allowance and Fees Due (PTOL-85)) dated Sep. 27, 2022 for U.S. Appl. No. 17/260,780 (pp. 1-3).

Australian Examination Report No. 1 issued in App. No. AU2023206101, dated Jun. 21, 2024, 3 pages.

* cited by examiner

ELECTRONIC GAMING MACHINE REWARD SYSTEM AND METHOD

CROSS REFERENCE TO RELATED APPLICATIONS

This application is a continuation of and claims priority to U.S. patent application Ser. No. 17/260,780, filed Jan. 15, 2021, which claims priority to International Application No. PCT/US/19/52846, filed Sep. 25, 2019, which claims priority to U.S. Provisional Patent Application No. 62/741,748, filed Oct. 5, 2018, each of which are incorporated by reference herein in their entireties.

TECHNICAL FIELD

The field of disclosure relates generally to electronic gaming, and more particularly, to systems and methods for enabling players to securely redeem digital rewards at an electronic gaming machine.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to “cash out.”

Slot games are often displayed to the player in the form of various symbols arranged in a row-by-column grid, or “matrix,” which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a “pay-table” that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

For game play itself, many EGMs are configured to enable players registered in a loyalty program to use their rewards to play additional wagering games on EGMs. However, a growing number of people enjoy playing mobile or web-based games. Many of these people are infrequent visitors to a casino or a physical establishment, such as a bar or a restaurant environment where EGMs are used. Hence, because a number of mobile or web-based games are available for play on a mobile device, some people may prefer playing such games on their mobile devices as opposed to visiting a physical establishment, such as a casino, to play wagering games on EGMs. Unfortunately, for those who play such games on their mobile devices, they may not be able to receive the awards or benefits that a person playing on an EGM at a casino may receive. Accordingly, a system that enables players to securely redeem digital rewards accrued via mobile or web-based games at an EGM is desirable.

SUMMARY

In one embodiment, a reward system is provided. The reward system comprises a tangible, non-transitory, computer-readable storage medium having instructions stored thereon and a processor. The at least one processor is in communication with a mobile computing device of a player and an electronic gaming machine. The at least one processor is configured to execute instructions stored in the storage medium, which, when executed by the at least one processor, causes the at least one processor to: (i) receive, from the mobile computing device, mobile game activity information of the player associated with a mobile game on the mobile computing device; (ii) award the player a first awarded prize based upon the mobile game activity information; (iii) store a first awarded prize entry in a player account associated with the player for subsequent redemption at the electronic gaming machine, the first awarded prize entry identifies the first awarded prize; (iv) detect a presence of the player at the electronic gaming machine, and (v) instruct the electronic gaming machine to display the first awarded prize when the player accesses the electronic gaming machine.

In another embodiment, an electronic gaming machine is provided. The electronic gaming machine includes at least one display device, a player input interface configured to receive player input from a player, a credit input mechanism, and a game controller. The credit input mechanism is configured to receive a credit wager. The game controller is configured to execute instructions stored in a tangible, non-transitory, computer-readable storage medium, which, when executed by the game controller, cause the game controller to at least: (i) receive, from the player, a player input requesting carding into the electronic gaming machine under a loyalty account of the player, (ii) identify one or more unredeemed awarded prize entries associated with the player, the one or more unredeemed awarded prize entries including a first awarded prize entry, (iii) determine, from the first awarded prize entry, a first awarded prize available for redemption at the electronic gaming machine, and (iv) display the first awarded prize on the at least one display device.

In yet another embodiment, a computer-implemented method of providing prizes associated with a mobile game at an electronic gaming machine is provided. The method includes: (i) receiving, from a mobile computing device, mobile game activity information of a player associated with the mobile game, (ii) awarding the player a first awarded prize based upon the mobile game activity information, (iii) storing a first awarded prize entry in a player account associated with the player for subsequent redemption at the electronic gaming machine, the first awarded prize entry identifies the first awarded prize, and (iv) instructing the electronic gaming machine to display the first awarded prize when the player accesses the electronic gaming machine.

BRIEF DESCRIPTION OF THE DRAWINGS

An example embodiment of the subject matter disclosed will now be described with reference to the accompanying drawings.

DETAILED DESCRIPTION

The present disclosure describes an electronic gaming machine (EGM) reward system (also referred to herein as a "reward system") for enabling digital rewards won on mobile or web-based games to be redeemed at an electronic gaming machine (EGM). The player's mobile gaming account has information from both the player's social gaming profile (e.g., player account profile) and the player's loyalty rewards profile associated with a physical establishment (venue) where EGMs are used, such as, for example, a casino. The reward system links the player's loyalty rewards account with the player's mobile gaming account associated with a mobile or web-based game. In the example embodiment, the player plays a mobile or web-based game on their mobile computing device. The system awards the player one or more swag bags during remote gameplay. The swag bags are digital rewards (e.g., prizes) that may only be redeemed at the physical venue. The system enables a player to securely card into (e.g., log into) an EGM using their mobile computing device or a physical player card, such as, for example, a loyalty rewards card. A player can cardlessly connect to the EGM with their mobile computing device by using a one-time code (OTC) generated by the system and/or a unique beacon identifier broadcast by a wireless beacon in the EGM. Digital rewards (e.g., prizes) accrued in a player's mobile gaming account, such as casino vouchers, free play credits, and virtual currency credits, are displayed at the EGM for redemption. Accordingly, a player is able to redeem digital rewards at the EGM that were accrued via remote gameplay.

Figure 1:
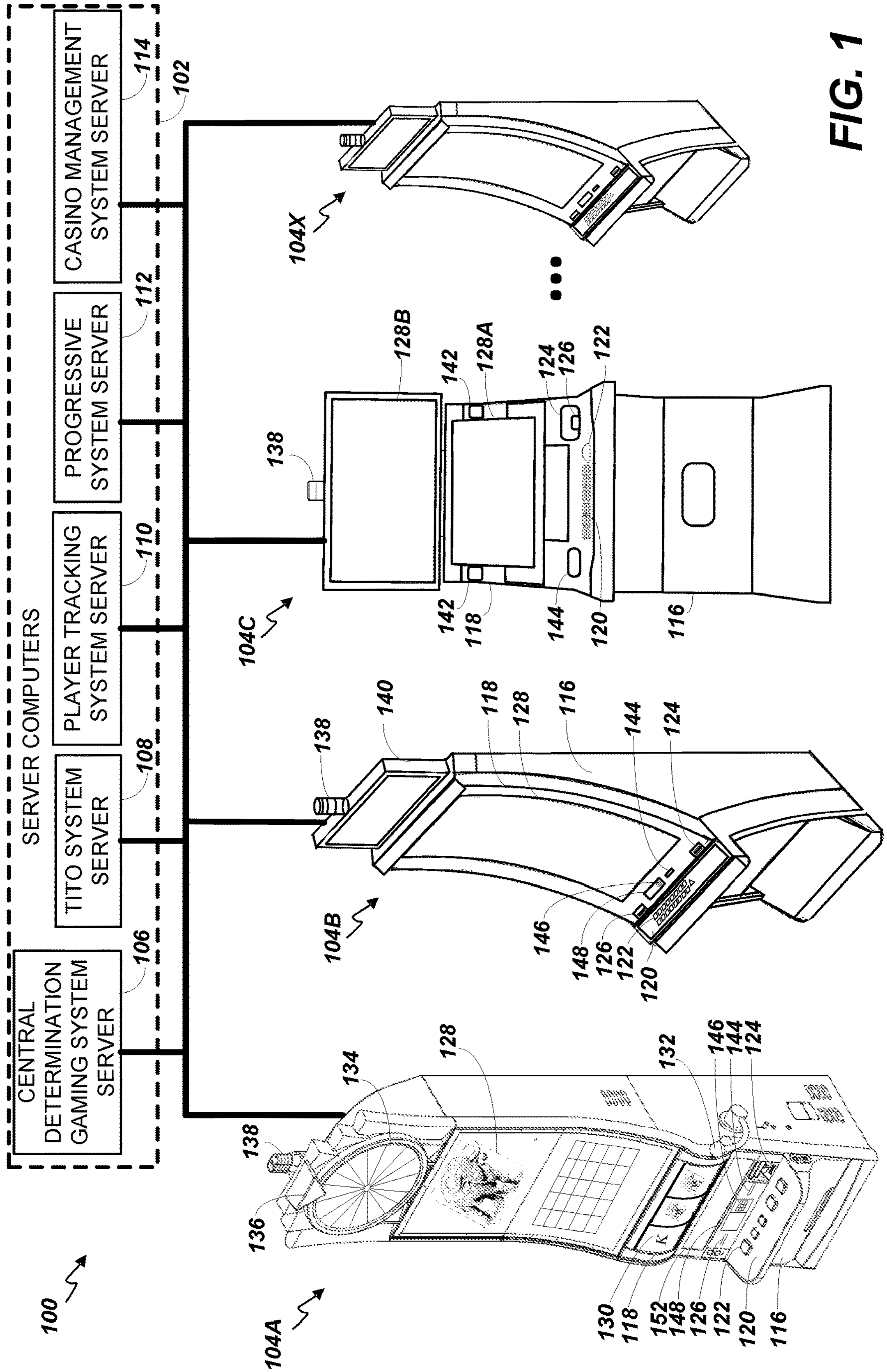
FIG. 1 is an exemplary diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a web site maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED (organic light emitting diode) panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
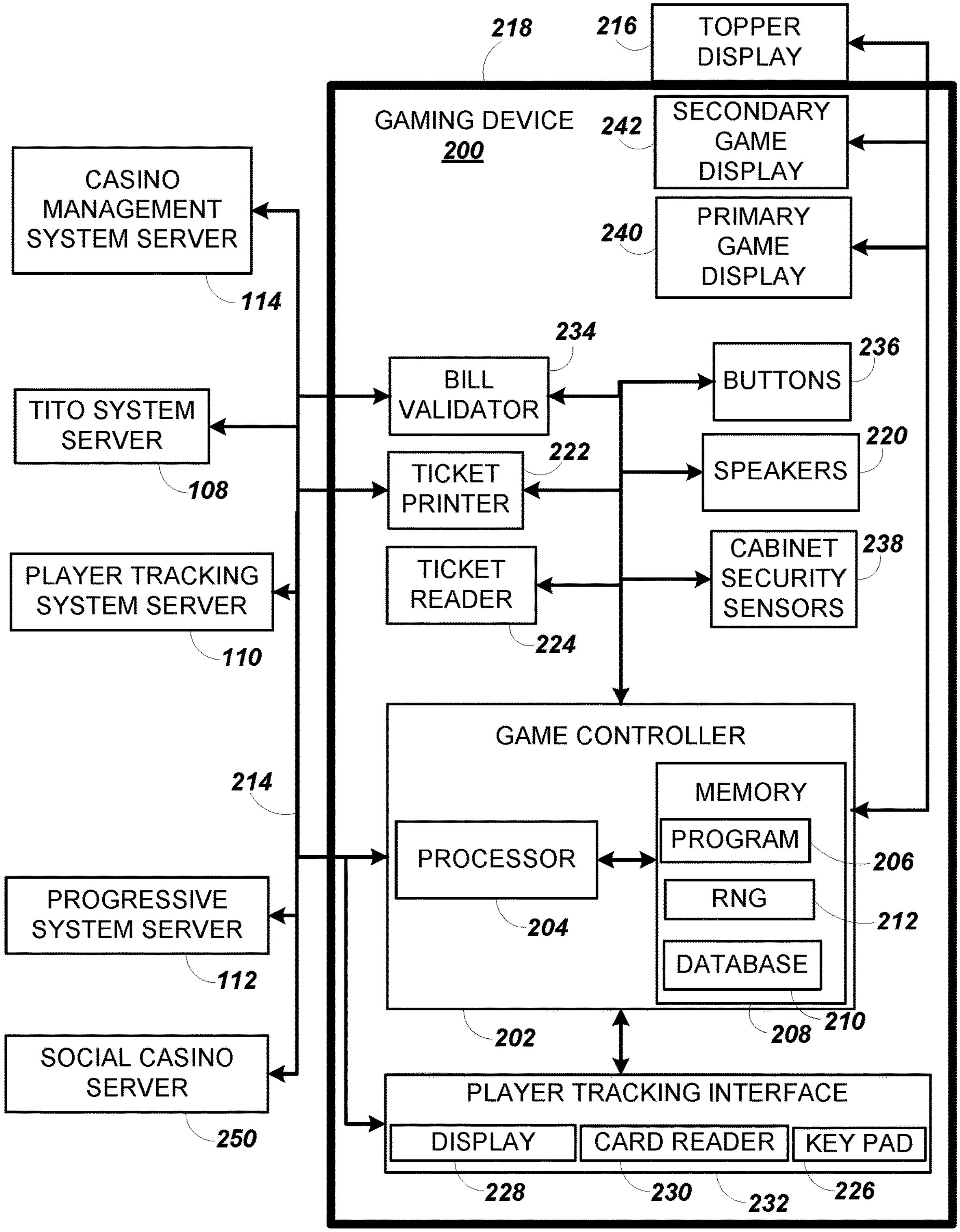
FIG. 2 is a block diagram showing various functional elements of an exemplary EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e. a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software and provide new technology in that they connect mobile gaming accounts of mobile games played on mobile computing devices with loyalty reward accounts associated with wagering games played on EGMs at brick-and-mortar establishments by enabling digital rewards won on mobile games to be securely redeemed at EGMs. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a key pad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110 and a social casino server 250. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. Player tracking system server 110 may also be in communication with social casino server 250 to track gameplay of mobile games. Social casino server 250 may provide a casino application ("app") that may be downloaded by players to play mobile games (e.g., social games, wagering games) or interact with other player functionality (e.g., digital wallet, loyalty program, messaging, funds management) on their mobile computing device.

When a player is at gaming device 200 in a gaming establishment, the player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards (e.g., prizes) may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
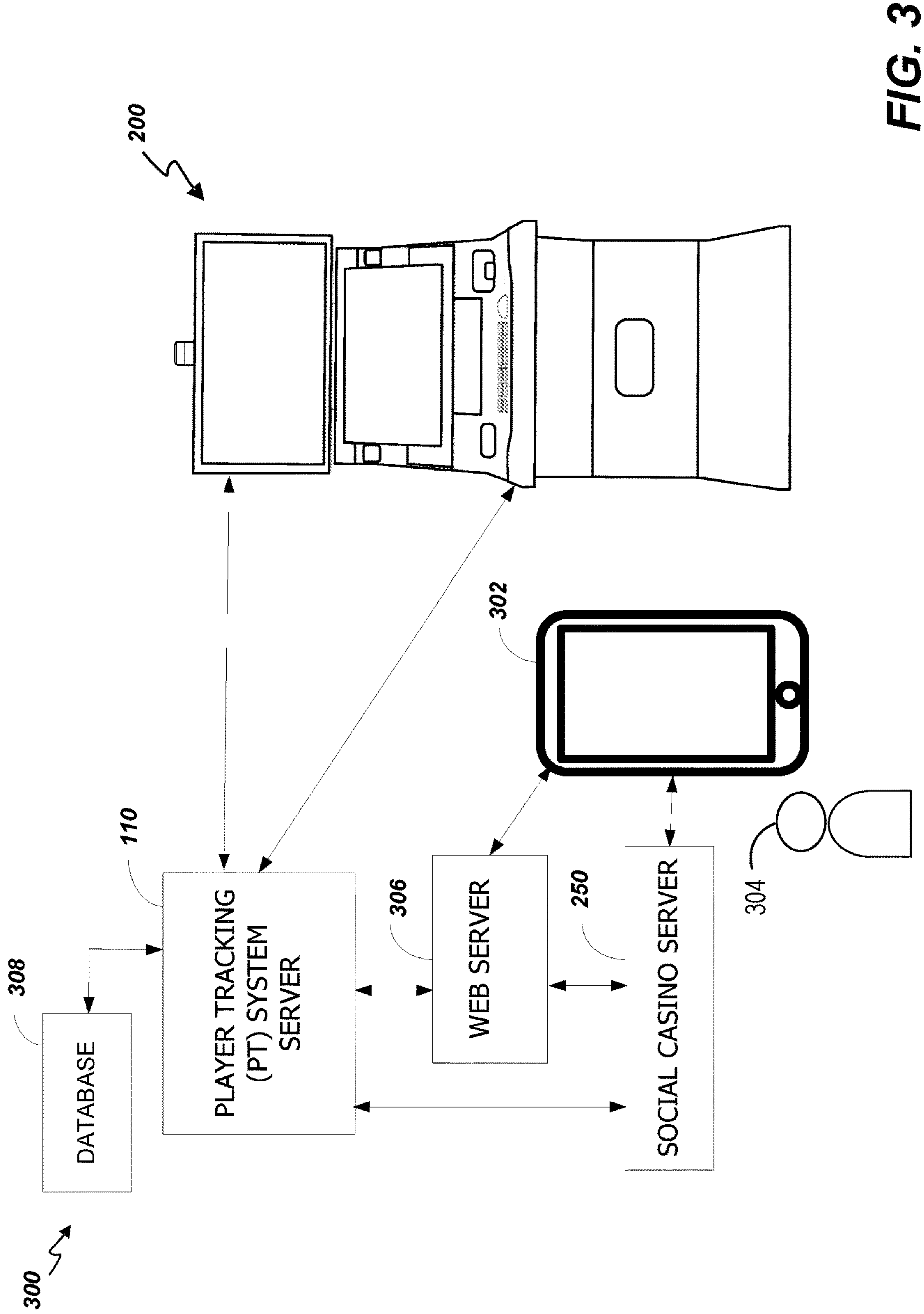
FIG. 3 is a schematic diagram showing an exemplary gaming reward system including an EGM networked with a player tracking (PT) system server for redeeming digital rewards won by playing mobile or web-based games at an EGM.

FIG. 3 is a schematic diagram showing an exemplary reward system 300 that enables digital rewards (e.g., prizes) to be won from games played on a mobile computing device 302 and to be redeemed by a player 304 at gaming device 200 in a physical venue. In the example embodiment, player 304 plays a social game (e.g., a mobile game) on mobile computing device 302. During remote gameplay, player 304 can achieve one or more swag bags through in-game accomplishments, time played, or other award triggers. Swag bags are digital rewards, including but are not limited to, free play credits, casino vouchers, free food or beverages, free merchandise, and virtual currency credits. Reward system 300 enables player 304 to redeem a reward or a prize (e.g., a swag bag) won from a mobile game (e.g., a social wagering game, a mobile wagering game) while physically present at gaming device 200.

In the example embodiment, the mobile game is a social game or a wagering game that can be played remotely on mobile computing device 302 via a software application ("app"), such as a casino gaming app or a web browser. The mobile game may be, for example, a game executed locally on mobile computing device 302 or may be a web-based game executed within a web browser on mobile computing device 302. In the example embodiment, player 304 has a mobile gaming account (e.g., a player account profile) associated with the mobile game. For example, player 304 may download a mobile gaming app associated with a slot game or a video poker game, for example, for remote gameplay on mobile computing device 302. The mobile gaming account of player 304 may be stored at database 308 or at social casino server 250.

In the example embodiment, mobile computing device 302 is in communication with web server 306, which is in communication with PT system server 110. In some embodiments, player 304 may play a web-based version of the mobile game hosted by web server 306. In various embodiments, social casino server 250 may collect data associated with plays, rewards, purchases, playing frequency, and/or gaming level from mobile computing device 302, and transmit the collected data to PT system server 110. In some embodiments, social casino server 250 transmits the collected data to PT system server 110 via web server 306. The mobile gaming account includes information, such as, but not limited to, login credentials (to access the mobile game), rewards, gaming history (e.g., data associated with the games played and the time/date played), purchase history (e.g., time/date virtual currency credits and/or items were purchased), and billing information.

In the example embodiment, player 304 is also registered with a loyalty reward program of a gaming operator (e.g., a casino). As such, player 304 also has a loyalty club account (or just "loyalty account") associated with the gaming operator. For example, the loyalty account may be associated with a loyalty program of a single casino, a chain of casinos, or some other physical establishment (e.g., physical venue), such as a bar or a restaurant, where wagering games, such as gaming device 200, are provided. As described above, loyalty programs typically seek to reward players 304 for their play and help build brand loyalty to the gaming operator. The rewards typically correspond to the level of patronage of player 304 (e.g., playing frequency, total amount of game plays or such) at a given casino. In some embodiments, player 304 may be a first-time visitor or an infrequent visitor who has registered for a loyalty account or may establish a new loyalty account through rewards system 300. PT system server 110 is used to track play (e.g., amount wagered, games played, time of play and/or other quantitative or qualitative measures) for individual players 304, track rewards (e.g., accumulated and redeemed rewards) for each player 304 who plays wagering games on gaming device 200. In particular, PT system server 110 is used to manage loyalty accounts for players 304 in the loyalty program.

In the example embodiment, rewards are earned through the mobile gaming account (e.g., social gaming account) associated with the player 304. The mobile gaming account is linked to the loyalty account of player 304 hosted by the operator. Reward system 300 includes gaming device 200 networked with PT system server 110. PT system server 110 is in communication, via a communications network (not shown in FIG. 3), with gaming device 200 and a web server 306. Web server 306 is in communication with social casino server (e.g., online gaming server) 250 and mobile computing device 302. Social casino server 250 is in communication with web server 306 and mobile computing device 302. Mobile computing device 302 may be, for example, a smart phone, a tablet, a laptop, or such.

In the example embodiment, when player 304 wins a swag bag during remote gameplay, social casino server 250 may transmit a player award message to PT system server 110 indicating that player 304 has won a swag bag. PT system server 110 may retrieve a player profile associated with player 304 from database 308 and update the player profile to create an entry that player 304 has won a swag bag, or may store an award record in an awards database and link that record with the loyalty account of player 304. When player 304 visits the physical venue and cards in at gaming device 200, gaming device 200 may communicate with PT system server 110 to access any stored awards of player 304 and present the swag bag on gaming device 200 for player 304 to select and redeem. In particular, once player 304 is carded into gaming device 200, the swag bag may be displayed in an overlay window (service window 458, shown in FIG. 4B) on gaming device 200. Player 304 may view and select their awards and may select which awards they wish to redeem. Upon player 304 selecting a swag bag for redemption, gaming device 200 transmits an award redemption request to PT system server 110. PT system server 110 may update the player profile of player 304 accordingly. Thus, player 304 has an incentive to redeem rewards won from mobile games at the physical venue.

Figure 4A:
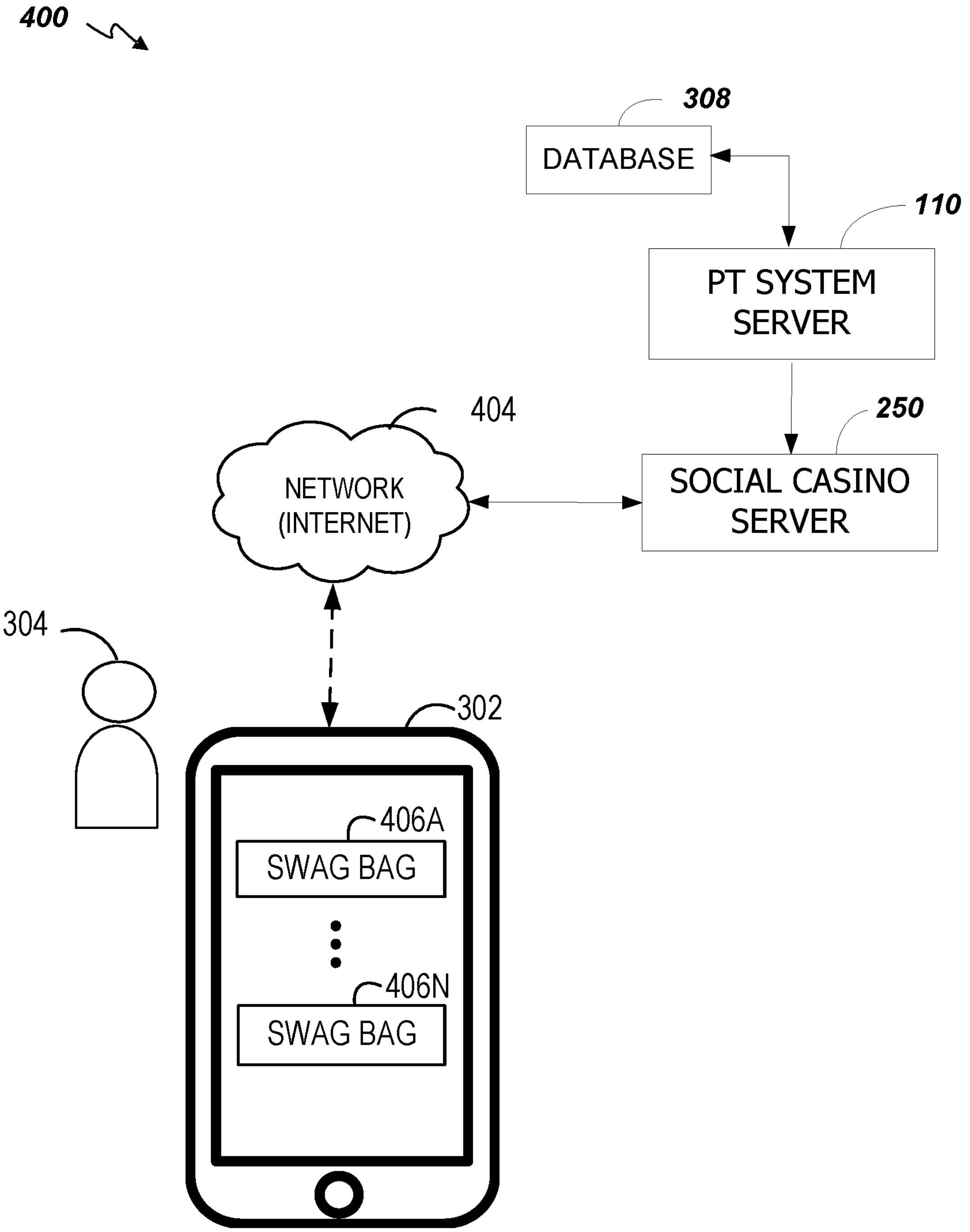
FIGS. 4A and 4B are diagrams respectively illustrating the mobile environment for winning a digital reward and the EGM environment for redeeming a digital reward.
Figure 4B:
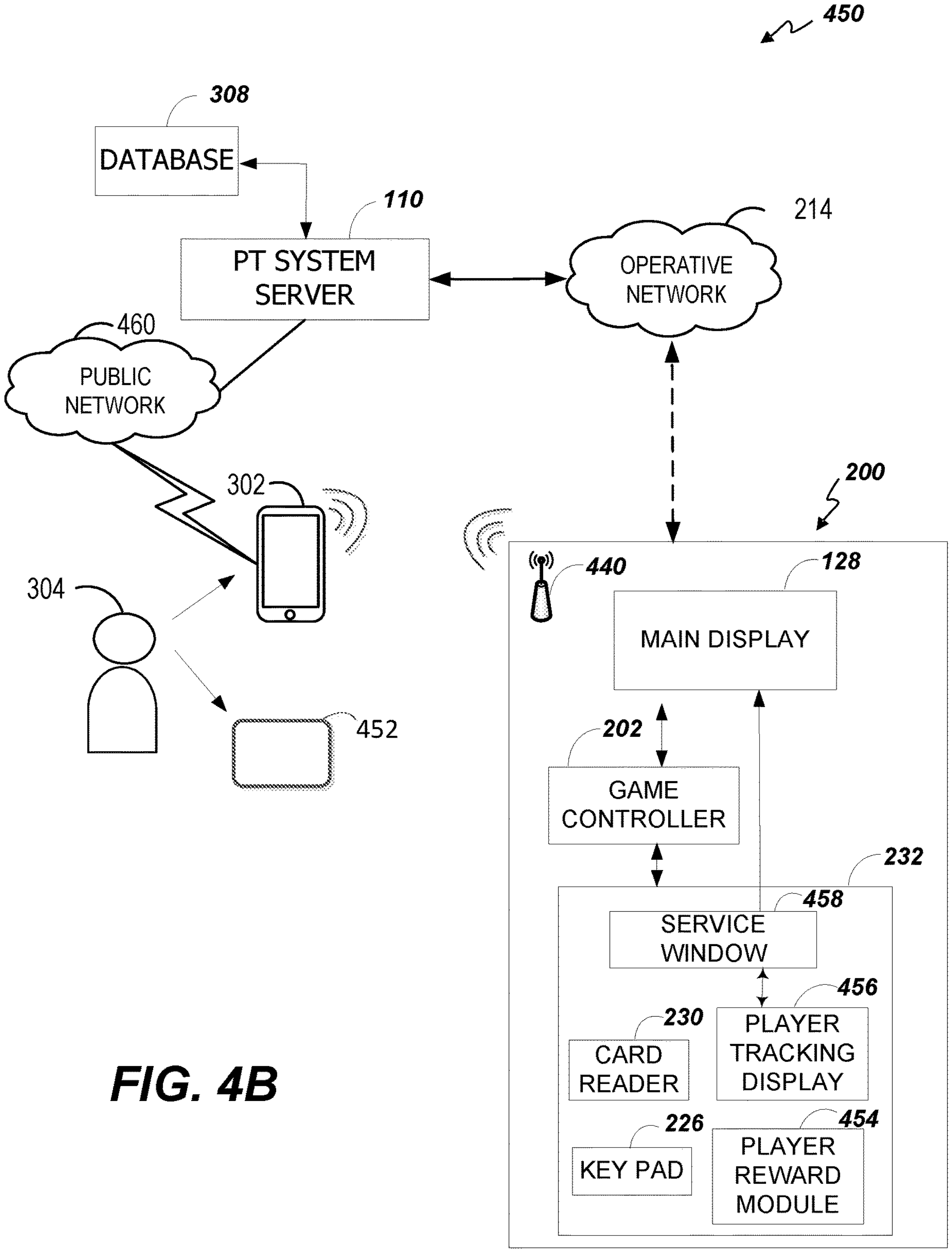

FIGS. 4A and 4B illustrate an example award and redemption process for swag bags as provided by reward system 300. In particular, FIG. 4A illustrates an example mobile gaming environment 400 in which player 304 accumulates one or more swag bags 406A-406N (collectively, "swag bags 406") while playing a mobile game. As shown in FIG. 4A, player 304 accumulates prizes (e.g., swag bags

406) when they play a mobile game on mobile computing device 302. In the example embodiment, player 304 is awarded swag bags when he or she satisfies a qualifying event. Qualifying events may include making qualifying purchases within the mobile game, such as purchases of virtual currency credits or items. For example, player 304 may satisfy a qualifying event for one or more swag bags when player 304 purchases a threshold quantity of virtual currency credits and/or items within the mobile game. Additionally or alternatively, qualifying events may be events that occur during mobile gameplay, such as, for example, when player 304 exceeds a certain number of plays, unlocks game features, and/or plays for a certain period of time. Qualifying events may also include in-game accomplishments (e.g., achieving a predetermined score, game-specific tasks or accomplishments, in-game purchases, level, or status) and participation accomplishments (e.g., participating in a multi-player tournament, exceeding an amount of time playing the game, achieving a daily play time for a predetermined number of days, inviting a number of new players into the game). In some embodiments, player 304 may be awarded swag bags 406 when he or she enters an invited geofenced area.

In the example embodiment, awards provided in swag bags 406 can include any of free plays, casino vouchers, and virtual currency credits. Free plays may be redeemed for gameplay on gaming machine 200 (e.g., as free play credits or free spins). Casino vouchers may include coupons that may be redeemed at the physical venue (e.g., for merchandise, food and beverage, free table game plays). Virtual currency credits may be credits for remote gameplay of mobile game on mobile computing device 302. In embodiments where player 304 is not a frequent visitor of the physical venue, player 304 may be awarded free play credits and/or casino vouchers instead of virtual currency credits to encourage player 304 to play at gaming machine 200 and experience gameplay at the physical venue. In various embodiments, a reward is predetermined based on factors such as, for example, the player's previous play on mobile computing device 302, the player's loyalty status (e.g., whether the player a frequent patron of the establishment), and the player's spending history at the establishment (e.g., how much money, on average, the player spends at the establishment).

In various embodiments, a swag bag may be determined from a selection of predetermined rewards (e.g., a fixed set of prizes). In these embodiments, the factors described above are used to determine which reward, from the selection of available rewards, to award the player. Rewards may include, but are not limited to, free play credits, casino vouchers, and virtual currency credits. In one embodiment, free play credits are provided to a player as a redeemable swag bag. Free play credits may be for a specific game or a type of game, such as, for example, a mobile game that player frequently plays on mobile computing device 302. Additionally or alternatively, free play credits may enable a player to play up to a predetermined number of rounds or for a predetermined period of time. In other embodiments, the swag bag may be a free play credit to play the player's favorite (or frequently played) mobile game on gaming device 200 for a chance to win real money instead of virtual currency credits.

Similar to the free play credits, the type and number of casino vouchers awarded to player 304 can be predetermined (based on the factors described above), fixed, or randomly determined from a range of pre-established voucher types and voucher quantities. Similar to the free play credits and the casino vouchers discussed above, the quantity of virtual currency credits may be predetermined (based on one or more of the factors described above), fixed, or randomly determined from a range of predetermined quantities (e.g., for example, virtual currency credits may only be awarded in amounts of 5, 10, or 100 currency credits).

In the example embodiment, social casino server 250 is configured to generate reward alert messages for display on mobile computing device 302 each time player 304 makes a purchase within the mobile game. In embodiments where a swag bag 406 is awarded while playing a web-based version of the mobile game, web server 306 may be configured to instruct mobile computing device 302 to display a reward alert message. Reward alert messages may direct player 304 to card into (e.g., log into) an electronic gaming machine (EGM), such as gaming device 200, to redeem the awarded swag bag 406 at a particular physical venue. For example, social casino server 250 may instruct mobile computing device 302 to display a reward alert message that states, "please go to Casino X at address Y to redeem your swag bag." As shown in FIG. 4A, player 304 may view the rewards won within the mobile game on mobile computing device 302. Reward entries are stored in the mobile gaming account of player 304 for subsequent redemption at an EGM. Player 304 may accumulate rewards over a period of time in his or her mobile gaming account.

In the example embodiment, mobile computing device 302 is in communication with social casino server 250 via a network 404, such as the Internet, a local area network (LAN), a cellular phone connection, or other such communication network. Social casino server 250 determines when a qualifying event is satisfied (e.g., when to award a swag bag), and determines the reward(s) in the swag bag to award to player 304. When player 304 satisfies a qualifying event during play of the mobile game, social casino server 250 may transmit a swag bag notification message to mobile computing device 302 to notify player 304. Social casino server 250 may also transmit, to PT system server 110, a swag bag award message including an account identifier associated with the player's mobile gaming account (e.g., player account profile) and a swag bag identifier associated with the awarded swag bag. PT system server 110 may retrieve player account profile of player 304 from database 308 and create a swag bag entry for the awarded swag bag in the player account profile, thereby updating player account profile of player 304 to reflect the awarded swag bag.

PT system server 110 is communicatively coupled to database 308. In the example embodiment, both the mobile gaming account and loyalty account of player 304 are stored at database 308. In other embodiments, the mobile gaming account of player 304 may be stored at a database separate from database 308. In these embodiments, PT system server 110 is in communication with both databases. In certain embodiments, player 304 only has a mobile gaming account. In various embodiments, PT system server 110 generates a player profile associated with each player 304 in the loyalty program, and stores the player profile at database 308. In these embodiments, the player profile includes data as to their loyalty account, such as, for example, login credentials associated with their loyalty account, games played at the physical establishment, rewards, and billing information. The player profile may also include data associated with their mobile gaming account, such as, for example, their account name and credentials, avatar icon and avatar name, and mobile game play data.

In the example embodiment, PT system server 110 links the loyalty account of player 304 with their mobile gaming account at database 308. PT system server 110 may link both accounts of player 304 together by matching the login credentials (e.g., account name, username) of the loyalty account to the login credentials of the mobile gaming account. In other embodiments, PT system server 110 links both accounts together by using account identifiers and/or player information. For example, PT system server 110 may link two accounts together by matching one or more details within the accounts, such as an email address, mailing address, phone number, and/or billing information to each other. In certain embodiments, PT system server 110 detects that a mobile gaming account and a loyalty account are both associated with player 304, and transmits a verification message via email and/or text message to player 304, requesting confirmation. Linking loyalty accounts with mobile gaming accounts of players 304 enables PT system server 110 to track and manage swag bags won by players 304.

FIG. 4B illustrates an example gaming establishment environment 450 in which player 304 redeems swag bags 406 won from gameplay of the mobile game at an electronic gaming machine (EGM), such as gaming device 200. As shown in FIG. 4B, in the example embodiment, player 304 visits the physical venue associated with swag bags 406 and cards into (e.g., logs into) gaming device 200 to redeem swag bags 406.

In particular, player tracking interface 232 is in communication with PT system server 110 via network 214. In the example embodiment, player tracking interface 232 includes a player reward module 454 that is configured to award and redeem swag bags 406 won from mobile games played on mobile computing device 302. Player tracking interface 232 also includes a player tracking display 456 (e.g., similar to player tracking display 228, shown in FIG. 2) and a service window 458 within player tracking display 456. In the example embodiment, service window 458 is an overlay window that is displayed on top of player tracking display 456 when a player has a swag bag 406. Swag bags 406 are displayed within service window 458. In the example embodiment, after player 304 is carded into gaming device 200, player reward module 454 prompts service window 458 to open and display swag bags 406 won by player 304. Player tracking interface 232 further includes card reader 230 and key pad 226.

In some embodiments, player 304 can use a physical player card 452, such as, for example, a loyalty club card (e.g., loyalty rewards card) associated with their loyalty account. For example, player 304 can use card reader 230 (shown in FIG. 2) to swipe or insert their loyalty club card into gaming device 200. In some embodiments, player 304 can cardlessly connect to gaming device 200 using mobile computing device 302. For example, player 304 can card in with mobile computing device 302 by using a one-time code (OTC) provided at gaming device 200. In these embodiments, player 304 selects a "mobile login" option displayed on player tracking display 228 to initiate login while physically present at gaming device 200. Player tracking interface 232 transmits a request for a one-time code to PT system server 110, and receives the one-time code generated by PT system server 110 in return. In certain embodiments, player tracking interface 232 of gaming device 200 generates the one-time code for display. Player tracking interface 232 displays the one-time code on player tracking display 228. Player 304 then enters the displayed one-time code on mobile computing device 302. More specifically, player 304 logs into a player app on mobile computing device 302, and subsequently enters the displayed one-time code in a designated area within the player app. The mobile computing device 302 transmits a login request to web server 306 via a public network 460 (e.g., the Internet, a WiFi network, or a mobile phone network). The login request includes authentication request information that identifies a user of mobile computing device 302 (e.g., player 304) and the inputted one-time code.

In cardless embodiments, PT system server 110 may authenticate the player by verifying that the one-time code received from mobile computing device 302 matches the one-time code generated by PT system server 110 or by gaming device 200. In certain embodiments, PT system server 110 has a time-out (e.g., log out) period associated with the one-time codes. In these embodiments, if player 304 does not input the generated one-time code into mobile computing device 302 within the designated time-out period, the login session ends and player 304 is required to initiate login again. If the received one-time code and the generated one-time code match, PT system server 110 transmits a login command to player tracking interface 232, prompting player tracking interface 232 to card player 304 in (e.g., log player 304 in). The login command may additionally include player authentication information (e.g., user name, password, device ID).

In an alternative embodiment, player 304 can card in with mobile computing device 302 by using wireless beacons, such as BLUETOOTH™-based or near-field communications (NFC) beacons. In these embodiments, gaming device 200 is equipped with an NFC beacon 440. A player selects a "mobile login" option in the player app and places their mobile computing device 302 near beacon 440 to initiate login. Initially, NFC beacon 440 is in an unpaired state and broadcasts a default beacon ID. Upon detection of a pairing attempt (e.g., by mobile computing device 302), gaming device 200 requests a custom ID from PT server system 110. PT server system 110 generates a custom ID, transmits the custom ID to gaming device 200, and stores it in database 308. Upon receipt, beacon 440 broadcasts the custom beacon identifier to mobile computing device 302. In various embodiments, player tracking interface 232 continuously broadcasts the unique beacon identifier.

In these embodiments, the mobile gaming app detects the custom beacon identifier broadcast by beacon 440, and transmits a login request to PT system server 110 via public network 460. The login request may include information, such as, but not limited to, the player's authentication information and the detected custom beacon identifier of beacon 440. PT system server 110 authenticates the player by verifying whether the received custom beacon identifier matches the transmitted unique beacon identifier. Upon successful authentication, PT system server 110 transmits an authentication success message to player tracking interface 232, allowing player tracking interface 232 to card the player in (e.g., begin rated session play). In some embodiments, player tracking interface 232 changes the custom beacon identifier for each new pairing attempt. In some embodiments, player 304 is required to complete one or more additional steps to complete the login process. For example, gaming device 200 may require player 304 to complete an additional step of entering a one-time code displayed on player tracking display 228 into mobile computing device 302 prior to carding the player in.

After player 304 cards into gaming device 200, PT system server 110 retrieves player activity information from the player's mobile gaming account in database 308. PT system server 110 detects, from the retrieved information, that player 304 has one or more rewards (e.g., swag bags 406) eligible for redemption in their mobile gaming account. In the example embodiment, PT system server 110 displays the one or more swag bags 406 at service window 458. More specifically, service window 458 is displayed as an overlay window on top of player tracking display 228. For example, upon carding into gaming device 200, service window 458 may open within player tracking display 228, and swag bags 406 may be displayed within service window 458. In other embodiments, PT system server 110 displays swag bags 406 at player tracking display 228 rather than overlaying service window 458 on top of player tracking display 228. In the example embodiment, player reward module 454 processes the swag bags 406. Player 304 can opt to redeem a reward at gaming device 200 by using, for example, key pad 226 to select the reward to be redeemed.

The free play credits are displayed at service window 458. In other embodiments, the free play credits are displayed at player tracking display 228. In other embodiments, the quantity of credits are fixed or are randomly determined from a range of established credit quantities (e.g., for example, credits may only be awarded in amounts of 5, 25, or 100 free play credits). If player 304 decides to redeem the free play credits and play a wagering game on gaming machine 200, PT system server 110 transfers the free play credits to gaming device 200 via player tracking interface 232.

In embodiments where player 304 redeems free play credits for play on gaming machine 200, player reward module 454 applies the free play credit and plays a wagering game selected by the player. In some embodiments, player reward module 454 instructs service window 458 to display the selected game. In some embodiments, swag bags 406 may include casino vouchers. If a player decides to redeem a casino voucher, "ticket-out" printer 126 (shown in FIG. 1) can print a casino voucher when the player redeems the reward. In some embodiments, rewards may include virtual currency credits. Virtual currency credits are credits that can be used to play games or purchase items within a mobile game played on mobile computing device 302. If player 304 decides to redeem the virtual currency credits, PT system server 110 transfers the redeemed credits to the mobile gaming account of player 304.

In the example embodiment, after player 304 redeems one or more swag bags 406 at gaming machine 200, the redeemed swag bag 406 of player 304 is updated as redeemed. Gaming machine 200 may transmit a redemption notification message to PT system server 110 via operative network 214, notifying PT system server 110 that swag bag 406 has been redeemed. The redemption notification message may include a player identifier associated with player 304, a machine identifier associated with gaming machine 200 at which swag bag 406 was redeemed, and other information regarding the swag bag redeemed. In response, PT system server 110 may retrieve the player account profile of player 304 from database 308 and update the player account profile to reflect the redeemed swag bag 406.

Figure 5:
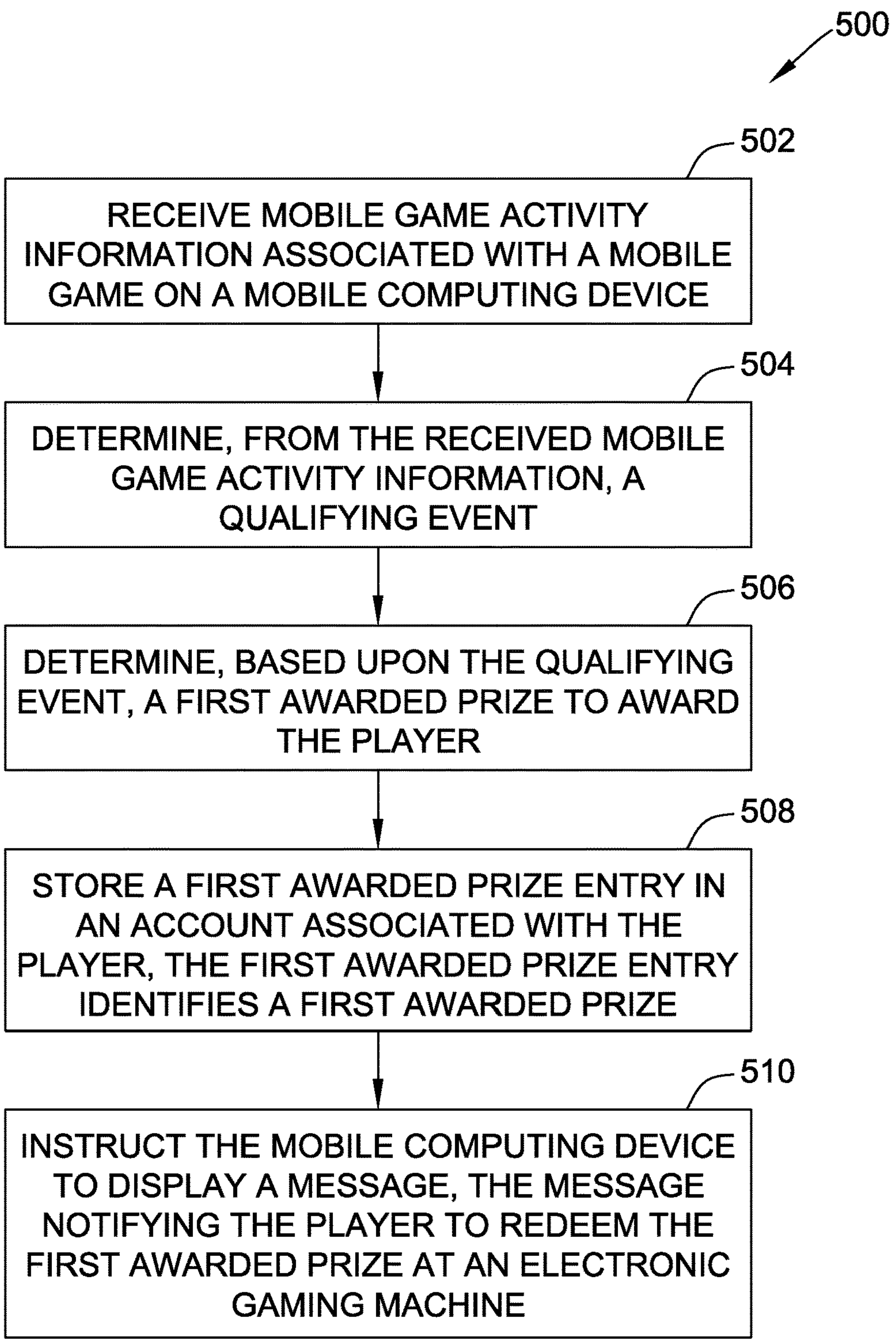
FIG. 5 is flow diagram of an exemplary method of awarding digital rewards for gameplay of a mobile or web-based wagering game.

FIG. 5 illustrates an exemplary method 500 of awarding digital rewards for remote gameplay of a mobile or web-based game. In particular, method 500 is implemented in mobile gaming environment 400 (shown in FIG. 4A). As shown in FIG. 5, method 500 includes receiving 502, by PT server system 110, mobile game activity information associated with a mobile game played on mobile computing device 302 associated with a player, such as player 304 (all shown in FIG. 4A). PT server system 100 may receive mobile game activity information from social casino server 250, which is in communication with the player's mobile computing device 302 (both shown in FIG. 4A). Method 500 also includes determining 504, from the received mobile game activity information, a qualifying event. As described above, a qualifying event may include a qualifying purchase made by the player in the mobile game and/or an event that occurs during remote gameplay of the mobile game. Method 500 also includes determining 506, by PT server system 110, a first awarded prize to award the player based upon the qualifying event. Prizes (e.g., swag bags 406A-406N, shown in FIG. 4A) may be predetermined based upon factors, including, for example, the player's historical play activity of the mobile game.

In some embodiments, prizes may be randomly determined. In other embodiments, prizes may be determined based upon the player's activity at a physical gaming establishment. For example, if PT server system 110 detects that the player does not have a loyalty rewards account to link with the player's mobile game account, PT server system 110 may determine that the player is an infrequent visitor of physical gaming establishments, such as casinos. In this example, when the player satisfies a qualifying event in the mobile game, PT server system 110 may award the player free play credits and/or casino vouchers instead of virtual currency credits to encourage the player to play at an EGM, such as gaming device 200. Method 500 also includes storing 508, by PT server system 110, a first awarded prize entry in an account associated with the player. The first awarded prize entry identifies the first awarded prize. For example, PT server system 110 may retrieve a mobile game account associated with the player from database 308 and create an entry in the player's account for the awarded swag bag. Method 500 also includes instructing 510 mobile computing device 302 to display a message to notify the player to redeem the awarded prize at an electronic gaming machine.

Figure 6:
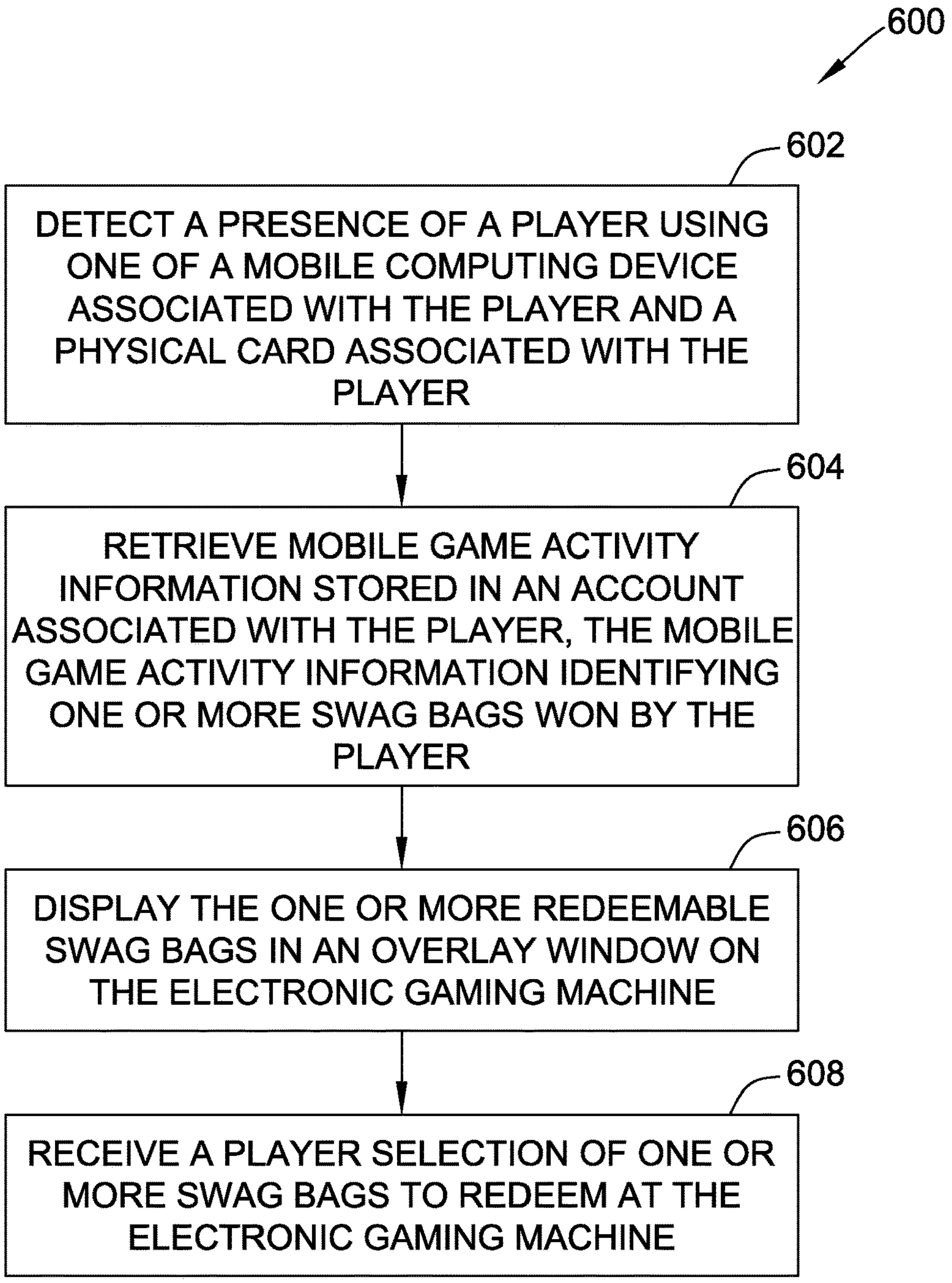
FIG. 6 is a flow diagram of an exemplary method of redeeming the rewards won from a mobile or web-based wagering game at an EGM.

FIG. 6 illustrates an exemplary method 600 of enabling a player, such as player 304 (shown in FIG.3), to redeem digital rewards won on a mobile or web-based game at an electronic gaming machine (EGM), such as gaming machine 200 (shown in FIG. 2). In particular, method 600 is implemented in gaming establishment environment 450 (shown in FIG. 4B). As shown in FIG. 6, method 600 includes detecting 602, by the EGM, a presence of the player. The EGM may detect the presence of the player by receiving a player input from the player (e.g., the player inserting a physical loyalty card into the EGM) or by detecting the player's mobile computing device 302 (e.g., pairing with the player's mobile computing device). If the player is detected via mobile computing device 302 (shown in FIG. 3), the EGM may initiate a mobile login process to authenticate the player, as described above. More specifically, the EGM may display a one-time code or broadcast a custom beacon identifier associated with the EGM. The player may input the displayed one-time code into mobile computing device 302 and transmit a login request message including the one-time code to PT server system 110. In embodiments where the EGM broadcasts a custom beacon identifier, mobile computing device 302 may pair or otherwise establish a connection with the EGM. In these embodiments, mobile computing device 302 may transmit, to PT server system 110, a login request message that includes the detected custom beacon identifier. After the player is authenticated, the player may be carded into (e.g., logged into) the EGM. In some embodiments, the EGM can detect the presence of the player using facial recognition (e.g., via a camera device built into the EGM and/or associated with the mobile computing device), fingerprint scanning (e.g., via a fingerprint sensor associated with the EGM and/or the mobile computing device), retinal scanning (e.g., via a retinal scanning device built into the EGM and/or associated with the mobile computing device), voice recognition (e.g., via audio input captured by a microphone on the EGM and/or the mobile computing device), additional types of DNA scanning, verification by an employee associated with the gaming operator (e.g., casino personnel), and/or verification by government ID (e.g., driver's license, passport).

Method 600 also includes retrieving 604 mobile game activity information associated with the player from the player's mobile gaming account in database 308. The retrieved mobile game activity information may include information regarding the one or more swag bags 406 (shown in FIG. 4A) accumulated by the player from remote gameplay of the mobile game on mobile computing device 302. Method 600 further includes displaying 606 the one or more swag bags detected from the retrieved mobile game activity information in an overlay window on the EGM. Method 600 also includes receiving 608 a player selection of one or more swag bags to redeem at the EGM.

Figure 7A:
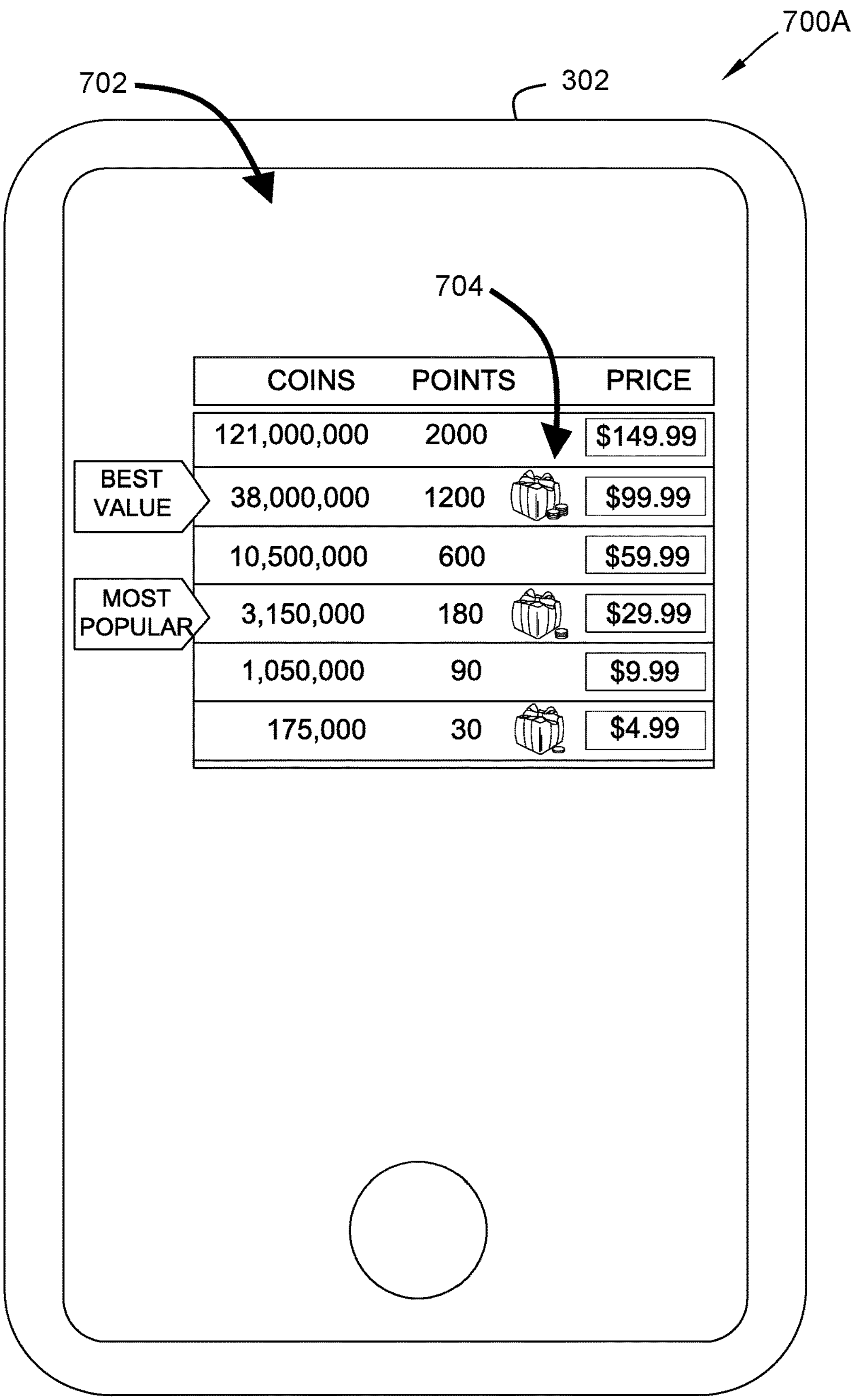
FIGS. 7A-7D are various screenshots of winning a digital reward in a mobile environment and redeeming the digital reward at an EGM environment, as shown in FIGS. 4A and 4B.
Figure 7B:
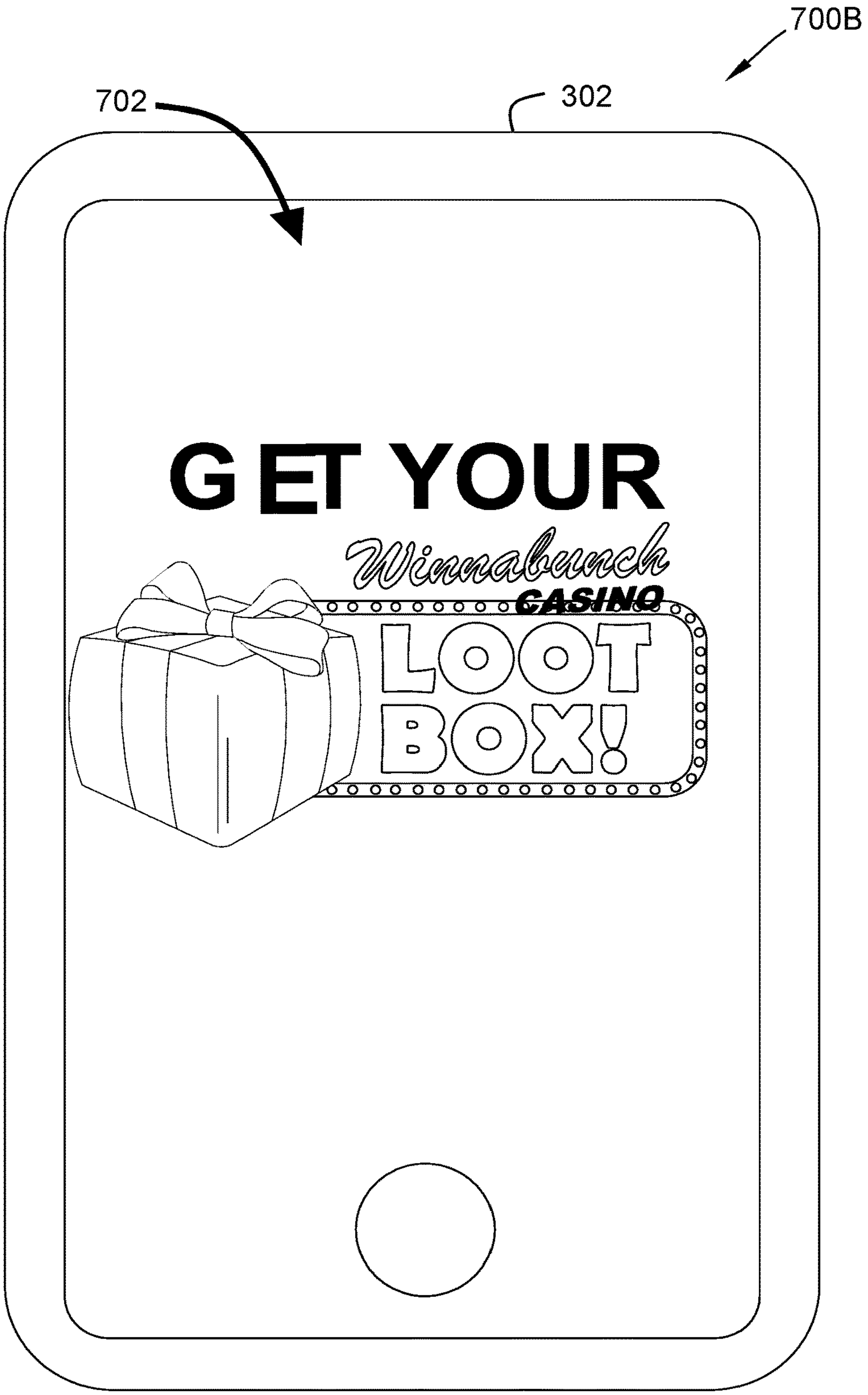
Figure 7C:
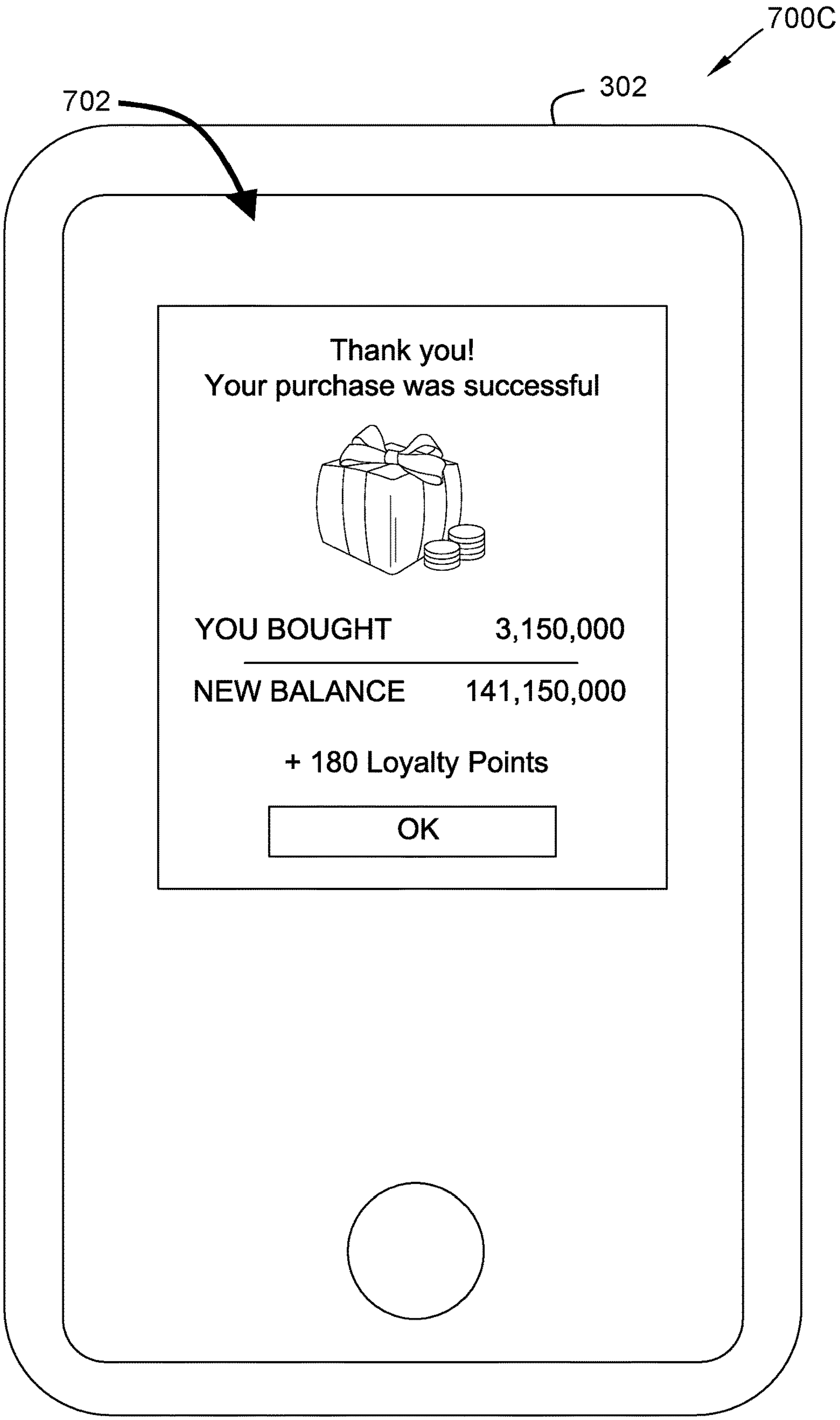

FIGS. 7A-7D are example screenshots of winning a digital reward in a mobile environment and redeeming the digital reward at an EGM environment, as shown in FIGS. 4A and 4B. In particular, FIGS. 7A-7C illustrate various screenshots displayed on a user interface 702 of mobile computing device 302 during an example award process, as described in FIG. 4A. FIG. 7A illustrates an example screenshot 700A of the user interface 702 for purchasing a variety of packs of virtual currency credits. As shown in FIG. 7A, some of the virtual currency packs are accompanied by a swag bag icon (or just "swag bag") 704. The player 304 may select a virtual currency pack for purchase that includes a swag bag 704. FIG. 7B illustrates an example screenshot 700B of the user interface 702 displaying a swag bag message to the player 304 when the player performs a purchase or otherwise achieves a swag bag 704. As shown in FIG. 7B, the swag bag message directs the player 304 to visit a physical venue, such as a casino, to redeem the swag bag 704 (e.g., "Get Your Loot Box at Winnabunch Casino"). FIG. 7C illustrates an example screenshot 700C of the user interface 702 displaying a purchase confirmation message. The purchase confirmation message may appear after the player 304 purchases a virtual currency pack with a swag bag.

Figure 7D:
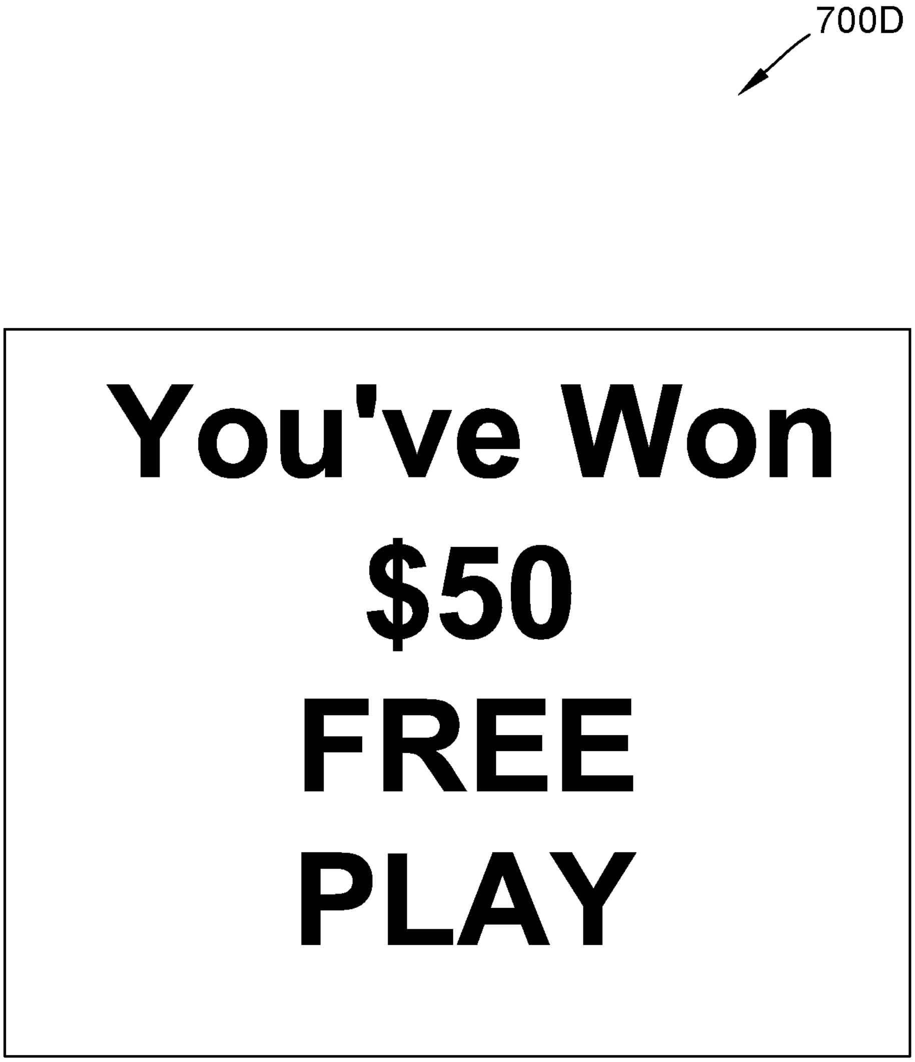

FIG. 7D illustrates an example screenshot 700D of an example swag bag message displayed on gaming device 200 (shown in FIG. 2) when the player 304 visits the physical venue to redeem the swag bag 704, as described in FIG. 4B. Once the player 304 visits the physical venue associated with the swag bag 704 and cards into (e.g., logs into) gaming device 200 to redeem the swag bag 704, a swag bag redemption button (not shown) may be displayed on gaming device 200. In some embodiments, when the player 304 presses the swag bag button, an interactive prize wheel (not shown) may be displayed on gaming device 200. The interactive prize wheel may be divided into various wedge sections that are associated with different types of swag bags, as described above. The interactive prize wheel also includes an arrow or pointer. The player 304 may spin the interactive prize wheel to determine a swag bag to redeem. When the interactive prize wheel stops spinning, the arrow lands on a wedge section, and the player 304 is awarded the swag bag associated with the wedge section. In other embodiments, the contents of the swag bag 704 may be predetermined and may be displayed to the player 304 upon redemption. In still other embodiments, the player 304 may be allowed to select from multiple award options, or the player 304 may be awarded randomly from a pool of potential awards (e.g., based on RNG output).

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming system comprising:
at least one memory with instructions stored thereon; and
at least one processor in communication with one or more user computing devices and the at least one memory, wherein the instructions, when executed by the at least one processor, cause the at least one processor to:
receive, from the one or more user computing devices, game activity information associated with a player account and an electronic game played at the one or more user computing devices;
identify a first output for redemption at one or more electronic gaming devices at a venue based on the game activity information;
store the first output as being associated with the player account and for redemption at the venue;
cause display of an alert at the one or more user computing devices, wherein the alert identifies the venue at which the first output can be provided;
electronically identify a presence of a user computing device of the one or more user computing devices at an electronic gaming device of the one or more electronic gaming devices; and
cause display, at the electronic gaming device, of the first output associated with the game activity information upon identifying the presence of the user computing device at the electronic gaming device.

2. The electronic gaming system of claim 1, wherein the instructions further cause the at least one processor to cause the first output to be presented at the electronic gaming device, wherein the first output comprises at least one of free play credits, casino vouchers, free food or beverages, free merchandise, or virtual currency credits.

3. The electronic gaming system of claim 1, wherein the instructions further cause the at least one processor to cause display, at the electronic gaming device, of the first output associated with the game activity information, wherein the first output is displayed in an overlay window on a display device of the electronic gaming device.

4. The electronic gaming system of claim 1, wherein the instructions further cause the at least one processor to, based on identifying the first output, cause display of the alert at the one or more user computing devices.

5. The electronic gaming system of claim 4, wherein the instructions further cause the at least one processor to cause display of the alert, wherein the alert comprises an address of the venue.

6. The electronic gaming system of claim 1, wherein the instructions further cause the at least one processor to store the first output as being associated with the player account, wherein the player account comprises an online gaming account.

7. The electronic gaming system of claim 6, wherein the instructions further cause the at least one processor to store the first output as being associated with the player account comprising the online gaming account, wherein a player associated with the player account is also associated with a loyalty account associated with the venue, and wherein the online gaming account is different from the loyalty account.

8. The electronic gaming system of claim 1, wherein the instructions further cause the at least one processor to:

identify a frequency with which the player account plays one or more electronic games at the one or more user computing devices based on the game activity information; and identify the first output based on the frequency.

9. The electronic gaming system of claim 1, wherein the instructions further cause the at least one processor to determine the first output based at least in part upon player tracking data of a player associated with the player account.

10. The electronic gaming system of claim 9, wherein the player tracking data comprises gaming data associated with electronic gaming activity of the player at the venue.

11. At least one non-transitory computer-readable storage medium with instructions stored thereon that, in response to execution by at least one processor, cause the at least one processor to:

receive, from one or more player computing devices, game activity information associated with a player account and an electronic game played at the one or more player computing devices;

determine a first output that can be redeemed at one or more electronic gaming devices at a venue based on the game activity information;

store the first output as being associated with the player account and for redemption at the venue;

control an alert to be displayed at the one or more player computing devices, wherein the alert comprises an identification of the venue;

electronically determine a presence of a player computing device of the one or more player computing devices at an electronic gaming device of the one or more electronic gaming devices at the venue; and control display, at the electronic gaming device, of the first output associated with the game activity information upon identifying the presence of the player computing device at the electronic gaming device.

12. The at least one non-transitory computer-readable storage medium of claim 11, wherein the instructions further cause the at least one processor to cause the first output to be presented at the electronic gaming device, wherein the first output comprises at least one of free play credits, casino vouchers, free food or beverages, free merchandise, or virtual currency credits.

13. The at least one non-transitory computer-readable storage medium of claim 11, wherein the instructions further cause the at least one processor to control display, at the electronic gaming device, of the first output associated with the game activity information, wherein the first output is displayed in an overlay window on a display device of the electronic gaming device.

14. The at least one non-transitory computer-readable storage medium of claim 11, wherein the instructions further cause the at least one processor to, based on identifying the first output, cause display of the alert at the one or more player computing devices.

15. The at least one non-transitory computer-readable storage medium of claim 11, wherein the instructions further cause the at least one processor to store the first output as being associated with the player account, wherein the player account comprises an online gaming account, and wherein a player associated with the player account is also associated with a loyalty account associated with the venue including the one or more electronic gaming devices, and wherein the online gaming account is different from the loyalty account.

16. The at least one non-transitory computer-readable storage medium of claim 11, wherein the instructions further cause the at least one processor to:

identify a frequency with which a player associated with the player account plays one or more electronic games at the one or more player computing devices based on the game activity information; and identify the first output based on the frequency.

17. An electronic gaming device comprising:

at least one memory with instructions stored thereon; and at least one processor in communication with the at least one memory, wherein the instructions, when executed by the at least one processor, cause the at least one processor to:

receive an input identifying a player account associated with a player;

identify one or more unredeemed outputs associated with the player account and a venue of the electronic gaming device, wherein the one or more unredeemed outputs are based on mobile game activity of the player account, and wherein the venue is identified in an alert provided to a player computing device associated with the player account;

identify an output of the one or more unredeemed outputs available for redemption at the electronic gaming machine and based on the mobile game activity; and cause display of the output based on the mobile game activity.

18. The electronic gaming device of claim 17, wherein the instructions further cause the at least one processor to:

receive a second input associated with selection of the output; and cause the output to be presented at the electronic gaming device, wherein the output comprises at least one of free play credits, casino vouchers, free food or beverages, free merchandise, or virtual currency credits.

19. The electronic gaming device of claim 17, wherein the player account comprises an online gaming account, and wherein the instructions further cause the at least one processor to receive a second input associated with a loyalty account, wherein the loyalty account is associated with a physical establishment including the electronic gaming device, and wherein the online gaming account is different from the loyalty account.

20. The electronic gaming device of claim 17, wherein the instructions further cause the at least one processor to:

transmit, to a user computing device associated with the player account, an invitation to a geofenced location;

identify that the user computing device has entered the geofenced location; and cause a second output to be stored in the player account based on identifying that the user computing device has entered the geofenced location.

* * * * *